United States Patent [19]
Cho

[11] Patent Number: 5,206,851
[45] Date of Patent: Apr. 27, 1993

[54] CROSS INTERLEAVING CIRCUIT

[75] Inventor: Hun-Chul Cho, Seoul, Rep. of Korea

[73] Assignee: Samsung Electronics Co., Ltd., Suwon, Rep. of Korea

[21] Appl. No.: 737,378

[22] Filed: Jul. 29, 1991

[30] Foreign Application Priority Data

Aug. 9, 1990 [KR] Rep. of Korea .................... 90-12212

[51] Int. Cl.[5] ............................................ G11B 00/00
[52] U.S. Cl. .................................... 369/48; 371/37.5; 369/59
[58] Field of Search ............................ 369/48, 49, 59; 371/37.4, 37.5, 38.1, 39.1, 40.1

[56] References Cited

U.S. PATENT DOCUMENTS

Re. 33,462 11/1990 Suzuki et al. ........................ 371/37.5
4,998,252 3/1991 Suzuki et al. ........................ 371/37.5

OTHER PUBLICATIONS

Pohlmann, "Principles of Digital Audio", Howard Sams & Co., Inc., 1985, pp. 193-211 & 215-229.

Primary Examiner—Donald E. McElheny, Jr.
Attorney, Agent, or Firm—Robert E. Bushnell

[57] ABSTRACT

There is provided a circuit for cross interleaving the digital audio data so as to adapt to the format of the compact disc by using a PROM. The circuit may be included in a compact disc player, for performing the real time encoding.

6 Claims, 10 Drawing Sheets

(PRIOR ART)

FIG. 4

| Symbol Number | Symbol Name | sequence |
|---|---|---|
| 0 | WmA | $m-12n-12\times(3)$ |
| 1 | WmB | $m-12n-12\times(D+2)$ |
| 2 | WmA | $m-12n+4-12\times(2D+3)$ |
| 3 | WmB | $m-12n+4-12\times(3D+2)$ |
| 4 | WmA | $m-12n+8-12\times(4D+3)$ |
| 5 | WmB | $m-12n+8-12\times(5D+2)$ |
| 6 | WmA | $m-12n+1-12\times(5D+3)$ |
| 7 | WmB | $m-12n+1-12\times(7D+2)$ |
| 8 | WmA | $m-12n+5-12\times(8D+3)$ |
| 9 | WmB | $m-12n+5-12\times(9D+2)$ |
| 10 | WmA | $m-12n+9-12\times(10D+3)$ |
| 11 | WmB | $m-12n+9-12\times(11D+2)$ |
| 12 | $\overline{Qm}$ | $m-12n-12\times(12D+1)$ |
| 13 | $\overline{Qm}$ | $m-12n+1-12\times(13D)$ |
| 14 | $\overline{Qm}$ | $m-12n+2-12\times(14D+1)$ |
| 15 | $\overline{Qm}$ | $m-12n+3-12\times(15D)$ |
| 16 | WmA | $m-12n+2-12\times(15D+1)$ |
| 17 | WmB | $m-12n+2-12\times(17D)$ |
| 18 | WmA | $m-12n+6-12\times(18D+1)$ |
| 19 | WmB | $m-12n+6-12\times(19D)$ |
| 20 | WmA | $m-12n+10-12\times(20D+1)$ |
| 21 | WmB | $m-12n+10-12\times(21D)$ |
| 22 | WmA | $m-12n+3-12\times(22D+1)$ |
| 23 | WmB | $m-12n+3-12\times(23D)$ |
| 24 | WmA | $m-12n+7-12\times(24D+1)$ |
| 25 | WmB | $m-12n+7-12\times(25D)$ |
| 26 | WmA | $m-12n+11-12\times(26D+1)$ |
| 27 | WmB | $m-12n+11-12\times(27D)$ |
| 28 | $\overline{Pm}$ | $m-12n-12$ |
| 29 | $\overline{Pm}$ | $m-12n+1$ |
| 30 | $\overline{Pm}$ | $m-12n+2-12$ |
| 31 | $\overline{Pm}$ | $m-12n+3$ |

| | AUDIO (−PRESENT FRAME) | | ECCOUT [−(PRESENT FRAME+2)] | | | |
|---|---|---|---|---|---|---|
| OFFSET COUNTER | FRAME | OFFSET | FRAME | OFFSET | DATA | PARITY |
| 0 | 0 | 0 | 5(3) | 0(0.A) | 0 | 1 |
| 1 | 0 | 1 | 8(D+2) | 1(0.B) | 0 | 1 |
| 2 | 0 | 2 | 13(2D+3) | 8(4.A) | 0 | 1 |
| 3 | 0 | 3 | 16(3D+2) | 9(4.B) | 0 | 1 |
| 4 | 0 | 4 | 21(4D+3) | 16(8.A) | 0 | 1 |
| 5 | 0 | 5 | 24(5D+2) | 17(8.B) | 0 | 1 |
| 6 | 0 | 6 | 29(6D+3) | 2(1.A) | 0 | 1 |
| 7 | 0 | 7 | 32(7D+2) | 3(1.B) | 0 | 1 |
| 8 | 0 | 8 | 37(8D+3) | 10(5.A) | 0 | 1 |
| 9 | 0 | 9 | 40(9D+2) | 11(5.B) | 0 | 1 |
| 10 | 0 | 10 | 45(10D+3) | 18(9.A) | 0 | 1 |
| 11 | 0 | 11 | 48(11D+2) | 19(9.B) | 0 | 1 |
| 12 | 0 | 12 | 51(12D+1) | 24 | 1 | 0 |
| 13 | 0 | 13 | 54(13D) | 25 | 1 | 0 |
| 14 | 0 | 14 | 59(14D+1) | 26 | 1 | 0 |
| 15 | 0 | 15 | 62(15D) | 27 | 1 | 0 |
| 16 | 0 | 16 | 67(16D+1) | 4(2.A) | 0 | 1 |
| 17 | 0 | 17 | 70(17D) | 5(2.B) | 0 | 1 |
| 18 | 0 | 18 | 75(18D+1) | 2(8.A) | 0 | 1 |
| 19 | 0 | 19 | 78(19D) | 13(6.B) | 0 | 1 |
| 20 | 0 | 20 | 83(20D+1) | 20(10.A) | 0 | 1 |
| 21 | 0 | 21 | 86(21D) | 21(10.B) | 0 | 1 |
| 22 | 0 | 22 | 91(22D+1) | 6(3.A) | 0 | 1 |
| 23 | 0 | 23 | 94(23D) | 7(3.B) | 0 | 1 |
| 24 | 0 | 24 | 99(24D+1) | 14(7.A) | 0 | 1 |
| 25 | 0 | 25 | 102(25D) | 15(7.B) | 0 | 1 |
| 26 | 0 | 26 | 107(26D+1) | 22(11.A) | 0 | 1 |
| 27 | 0 | 27 | 110(27D) | 23(11.B) | 0 | 1 |
| 28 | 0 | 28 | 3(1) | 28 | 1 | 0 |
| 29 | 0 | 29 | 2(0) | 29 | 1 | 0 |
| 30 | 0 | 30 | 3(1) | 30 | 1 | 0 |
| 31 | 0 | 31 | 2(0) | 31 | 1 | 0 |

SELECT-000  D−4  SELECT-001

FIG. 7B

| Q1 Encoding [-(PRESENT FRAME+1)] | | Q2 Encoding [-(PRESENT FRAME+1)] | | P Encoding [-(PRESENT FRAME+1)] | |
|---|---|---|---|---|---|
| FRAME | OFFSET | FRAME | OFFSET | FRAME | OFFSET |
| 3(2) | 0(0.A) | 0 | 0 | 3(2) | 0(0.A) |
| 3(2) | 1(0.B) | 0 | 0 | 7(D+2) | 1(0.B) |
| 3(2) | 8(4.A) | 0 | 0 | 11(2D+2) | 8(4.A) |
| 3(2) | 9(4.B) | 0 | 0 | 15(3D+2) | 9(4.B) |
| 3(2) | 16(8.A) | 0 | 0 | 19(4D+2) | 16(8.A) |
| 3(2) | 17(8.B) | 0 | 0 | 23(5D+2) | 17(8.B) |
| 3(2) | 2(1.A) | 0 | 0 | 27(6D+2) | 2(1.A) |
| 3(2) | 3(1.B) | 0 | 0 | 31(7D+2) | 3(1.B) |
| 3(2) | 10(5.A) | 0 | 0 | 35(8D+2) | 10(5.A) |
| 3(2) | 11(5.B) | 0 | 0 | 39(9D+2) | 11(5.B) |
| 3(2) | 18(9.A) | 0 | 0 | 43(10D+2) | 18(9.A) |
| 3(2) | 19(9.B) | 0 | 0 | 47(11D+2) | 19(9.B) |
| 0 | 0 | 0 | 0 | 49(12D) | 24 |
| 0 | 0 | 0 | 0 | 53(13D) | 25 |
| 0 | 0 | 0 | 0 | 57(14D) | 26 |
| 0 | 0 | 0 | 0 | 61(15D) | 27 |
| 0 | 0 | 1(0) | 23(11.B) | 65(16D) | 4(2.A) |
| 0 | 0 | 1(0) | 22(11.A) | 69(17D) | 5(2.B) |
| 0 | 0 | 1(0) | 15(7.B) | 73(18D) | 12(6.A) |
| 0 | 0 | 1(0) | 14(7.A) | 77(19D) | 13(6.B) |
| 0 | 0 | 1(0) | 7(3.B) | 81(20D) | 20(10.A) |
| 0 | 0 | 1(0) | 6(3.A) | 85(21D) | 21(10.B) |
| 0 | 0 | 1(0) | 21(10.B) | 89(22D) | 6(3.A) |
| 0 | 0 | 1(0) | 20(10.A) | 93(23D) | 7(3.B) |
| 0 | 0 | 1(0) | 13(5.B) | 97(24D) | 14(7.A) |
| 0 | 0 | 1(0) | 12(5.A) | 101(25D) | 15(7.B) |
| 0 | 0 | 1(0) | 5(2.B) | 105(26D) | 22(11.A) |
| 0 | 0 | 1(0) | 5(2.A) | 109(27D) | 23(11.B) |
| 1 | 24 | 1(0) | 24 | 1(0) | 28 |
| 1 | 25 | 1(0) | 25 | 1(0) | 29 |
| 1 | 26 | 1(0) | 26 | 1(0) | 30 |
| 1 | 27 | 1(0) | 27 | 1(0) | 31 |
| SELECT-01X | | SELECT-10X | | SELECT-11X | |

FIG. 8A

CROSS INTERLEAVING CIRCUIT

TECHNICAL BACKGROUND

The present invention concerns an encoding circuit for a recordable compact disc system, and particularly a circuit for cross interleaving digital audio data so as to adapt for the compact disc format by using a PROM.

Generally, the compact disc has been exclusively used for reproduction. However, a recordable compact disc is recently developed which requires a compact disc player to have a circuit for encoding audio data so as to be compatible with the conventional recordable compact disc.

Figure 1:
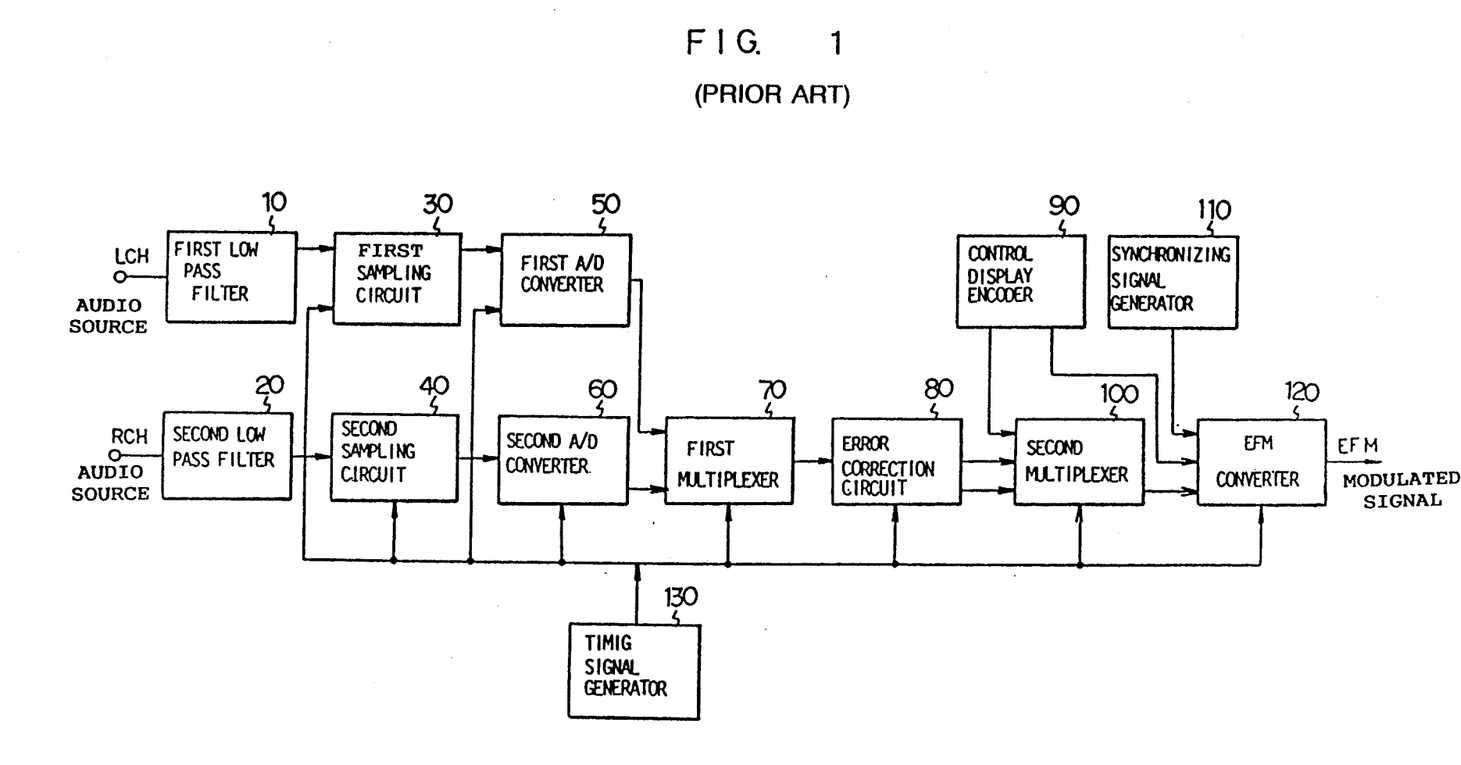
FIG. 1 is a block diagram of a conventional compact disc encoding system.

Referring to FIG. 1, there is briefly described a conventional system for encoding audio data. The analog signals of the L and R channel audio sources are respectively passed through the first and second low pass filters 10 and 20 to produce the signals below 20 KHz, which signals are sampled by the first and second sampling circuits 30 and 40 at the period of 44.1 KHz. The sampled signals are respectively applied to the first and second analog/digital converters (A/D converters) 50 and 60 quantized into digital data of 16 bits at every sampling period (quantization ratio=44.1K sample/sec×2 symbol/sample=88.2K symbol/sec, where 1 symbol=one byte). The 16 bits digital data of the two L and R channels are selected by the multiplexer 70 (88.2K symbol/sec×2CH=176.4K symbol/sec). The data output from the first multiplexer 70 is applied to the error correction circuit 80 to produce a parity of 8 bytes by adding a parity of 4 bytes to 12 bytes when receiving the data of 24 bytes.

The control and display encoding circuit 90 produces 1 byte of the control data for the microcomputer to process music selection, etc. per 1 frame. The second multiplexer 100 generates 1 frame data of 8 symbols consisting of 1 symbol of the control and display, 12 symbols of the L channel (16 bits×6), 12 symbols of R channel (16 bits×6) and 8 symbols of the parity. At this time, the selection order is 1 symbol of the control and display data→12 symbols of the audio data (alternately output in L channel high, L channel low, R channel high, R channel low)→4 symbols of the parity→12 symbols of the audio data (alternately output in L channel high, L channel low, R channel high, R channel low)→4 symbols of the parity.

Figure 2:
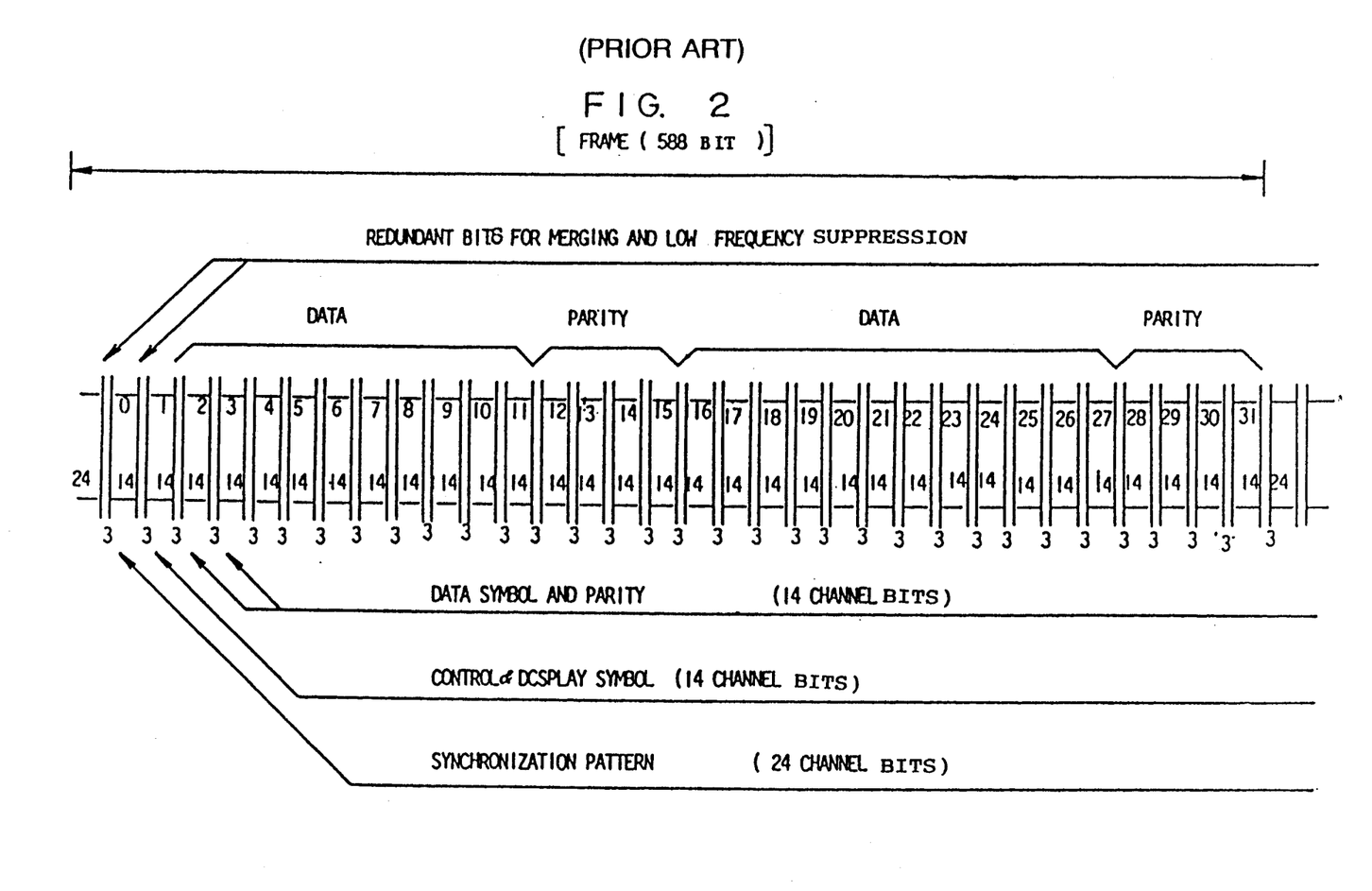
FIG. 2 is a data pattern of a frame recorded on a conventional compact disc (CD)

The EFM modulator 120 modulates each of the symbols synchronized with a frame according to the output of the synchronization signal generator 110 into the channel signal of 14 bits per 8 bits, which channel signal is delivered to the disc. The form of the 1 frame data recorded on the disc is as shown in FIG. 2. Namely, 1 symbol recorded on the disc is the channel signal of 14 bits, the synchronization pattern of 24 bits is recorded in the first position of the frame, and sequentially recorded are the control and display symbol, data symbol, and parity symbol.

Between the symbols is recorded the merge signal of 3 bits. Thus, one frame consists of totally 588 channel bits. Referring to FIG. 2, the merge signal serves to maintain the run length to be within the range of 3 T to 11 T when the channel bits are merged together.

Figure 3:
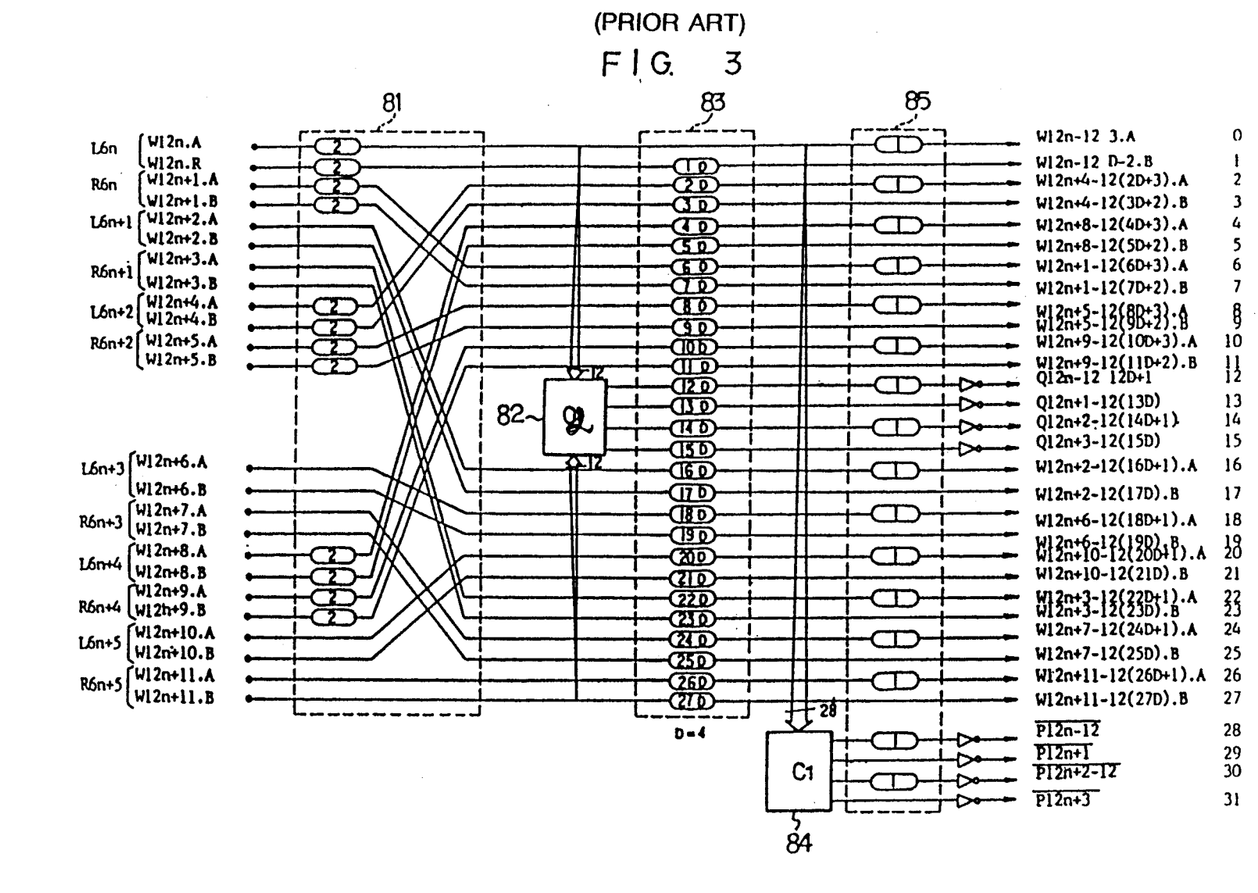
FIG. 3 is a specific block diagram of the error correction circuit (80) of FIG. 1.

Referring to FIG. 3 for illustrating the error correction circuit 8, the first delay circuit 81 delays 16 bits 2'S complemented data by two frames so as to produce the symbol data of 8 bits.

The first encoder 82 encodes the output of the first delay circuit 81 to generate C2(28,24) RS parity. The second delay circuit 83 delays the data output from the first encoder 82 by the frames corresponding to a multiple of 4. The second encoder 84 encodes the data output from the second delay circuit 83 to generate C1(32,28) RS parity. The third delay circuit 85 delays the data output from the second encoder 84 by one frame.

Figure 4:
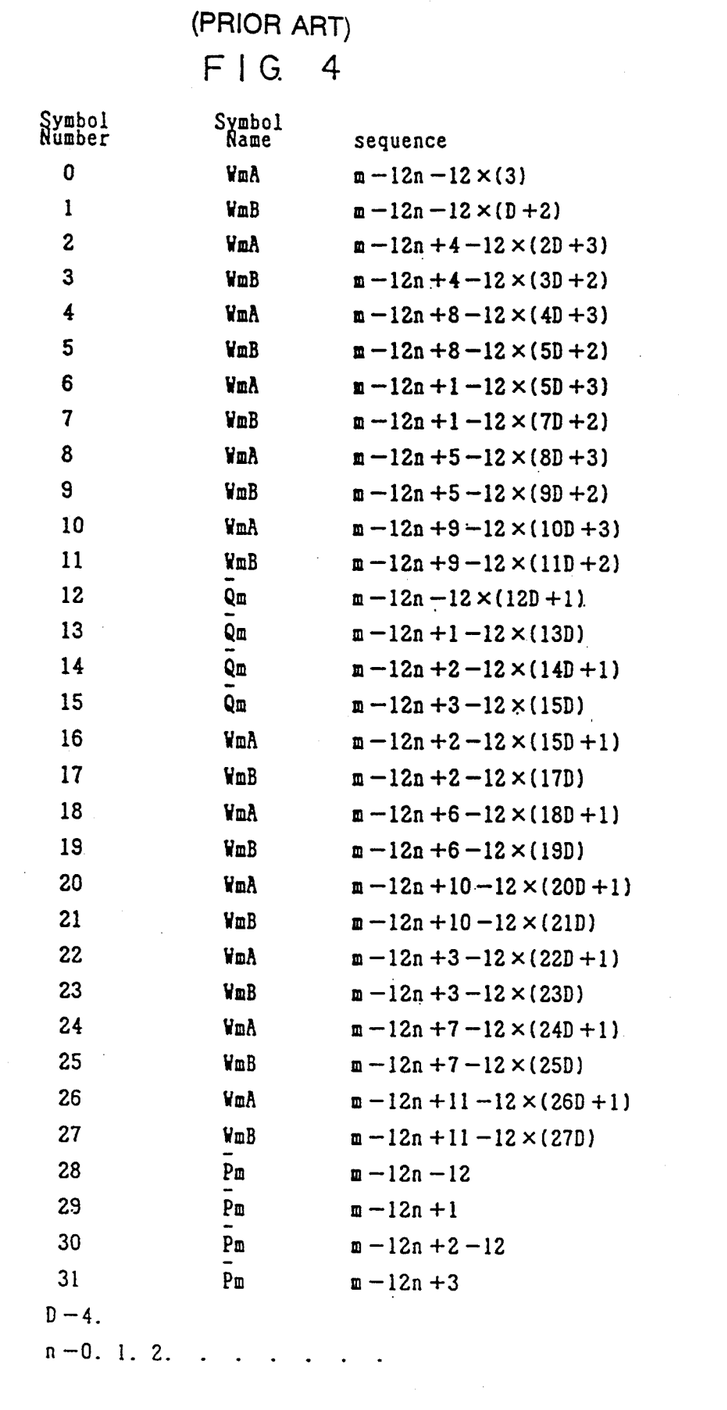
FIG. 4 illustrates the construction of one frame symbol data output from the encoder.

Referring to FIG. 4 for illustrating the construction of one frame data output from the encoder of FIG. 3, the data output from the error correction circuit 80 of FIG. 1 is laid out on the basis of one frame input into the encoder. For example, to represent the construction of one frame, the symbol number 27 consists of $M=12n+11-12(27D)$, which means that a word of the audio data should be delayed by $11-12\times27\times4=1,296$ words to be output.

Such a conventional error correction circuit may not directly included in a compact disc player because the encoder should process the data prior to recording on the compact disc without manufacturing the disc in real time.

SUMMARY OF THE INVENTION

The object of the present invention is to provide a circuit for cross interleaving the digital audio data so as to adapt to the format of the compact disc by using a PROM, for performing the real time encoding. This cross interleaving circuit may be included in a compact disc player.

According to the present invention, there is provided a circuit for cross interleaving the digital audio data for a recordable compact disc player system comprising, a controller for controlling said system by receiving a system clock signal (8,643 MHz), a buffer for loading said audio data on a data bus in response to a control signal of said controller, an offset counter for counting a symbol clock signal of said controller so as to generate the offset value of a frame, a frame counter for counting a frame clock signal of said controller so as to distinguish a frame unit, a frame table for determining the quantity of the frame delayed in order to perform encoding on the basis of the present frame by receiving the offset value of said offset counter and a select value according to the control of said controller, an offset table for generating the offset address of a frame by receiving the offset value of said offset counter and the select value of said controller, an adder for adding the frame counted value of said frame counter and the frame table value selected from said frame table so as to generate a frame address, a RAM for temporarily storing the audio data and encoded parity data, an encoder for loading the data from said RAM on a data bus in response to ECCOUT signal controlled by said controller by synchronizing the data with a data latch clock signal to generate a parity, a first latch circuit for latching the encoded data of said RAM by synchronizing the data with EFM latch clock signal during the data interval, and a second latch circuit for inversely latching the encoded data of said RAM by synchronizing the data with the EFM latch clock signal during the parity interval.

The present invention will now be described with reference to the drawings attached only by way of example.

DETAILED DESCRIPTION OF A CERTAIN PREFERRED EMBODIMENT

Figure 5:
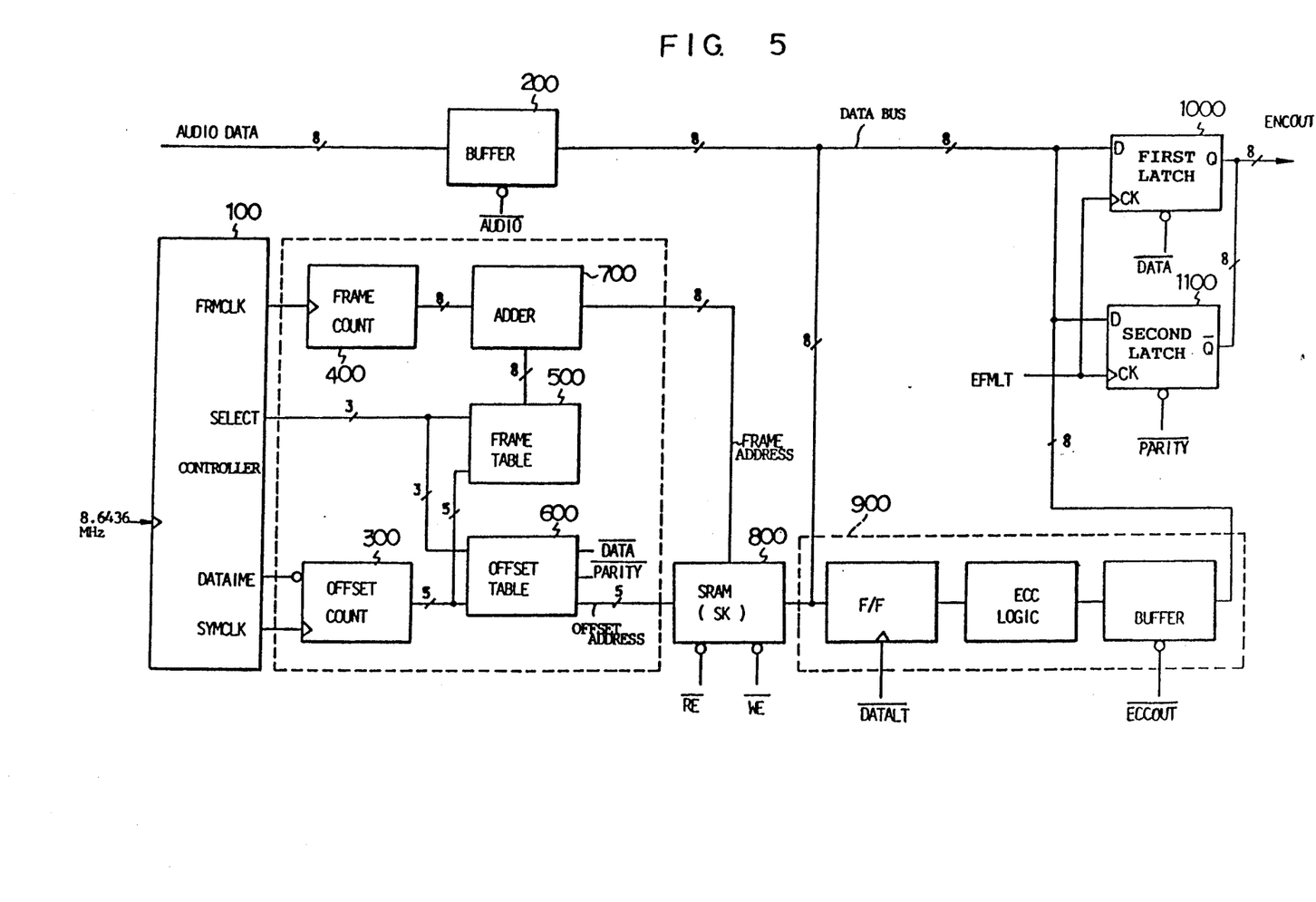
FIG. 5 is a block diagram of the inventive cross interleaving circuit.

Referring to FIG. 5, a controller 100 controls the system by receiving a system clock signal (8,643 MHz). A buffer 200 loads the audio data on a data bus in response to a control signal of the controller. An offset counter 300 counts a symbol clock signal of the controller 100 so as to generate the offset value of a frame. A frame counter 400 counts a frame clock signal of the controller 100 so as to distinguish a frame unit. A frame table 500 determines the quantity of the frame delayed in order to perform encoding on the basis of the present frame by receiving the offset value of the offset counter 300 and a select value according to the control of the controller 100. An offset table 600 generate the offset address of a frame by receiving the offset value of the offset counter 300 and the select value of the controller 100. An adder 700 adds the frame counted value of the frame counter 400 and the frame table value selected from the frame table 500 so as to generate a frame address. A RAM 800 temporarily stores the audio data and encoded parity data. An encoder 900 loads the data from the RAM 800 on the data bus in response to the error correcting code output (ECCOUT) signal controlled by the controller 100 by synchronizing the data with a data latch clock signal to generate a parity. A first latch circuit 1000 latches the encoded data of the RAM 800 by synchronizing the data with the EFM latch clock signal during the data interval. A second latch 1100 inversely latches the encoded data of the RAM 800 by synchronizing the data with the EFM latch clock signal during the parity interval.

Figure 6:
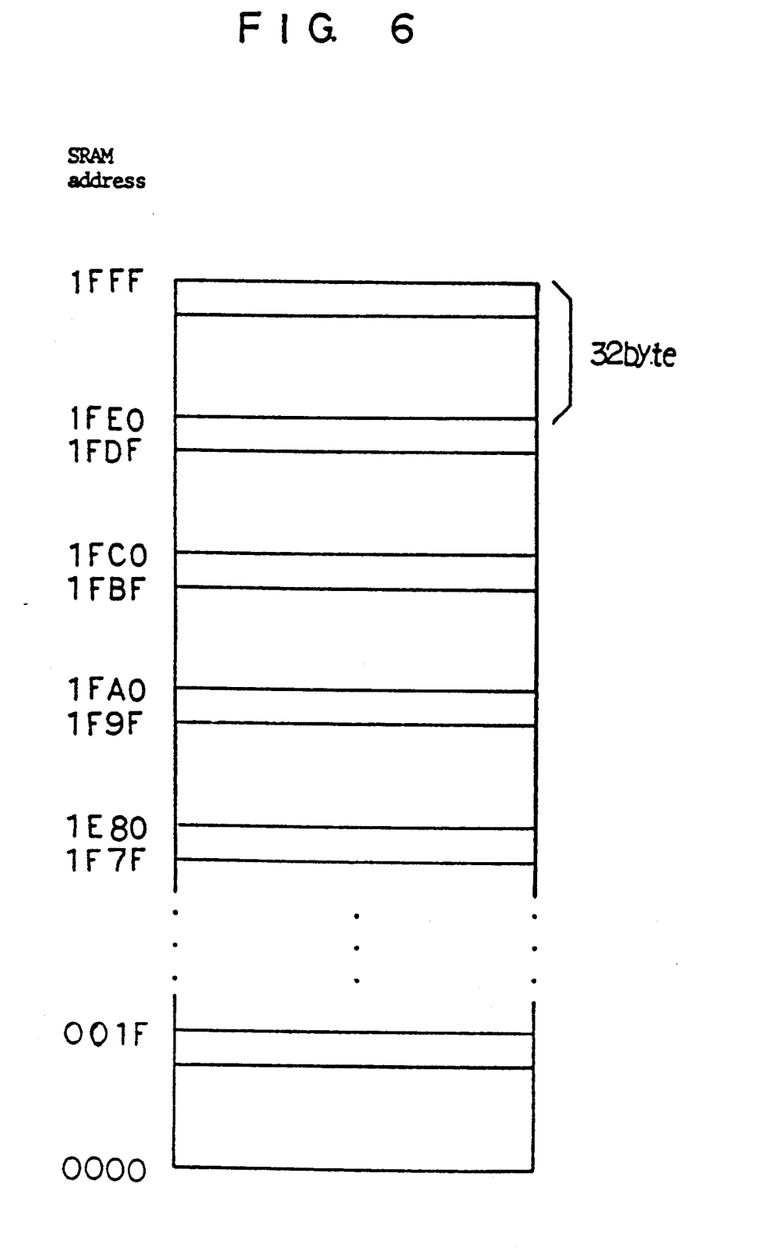
FIG. 6 illustrates the construction of the frame memory map.

Referring to FIG. 6 8K RAM is effectively divided into 128 frames by binding 32 bytes into one frame.

Figure 8A:
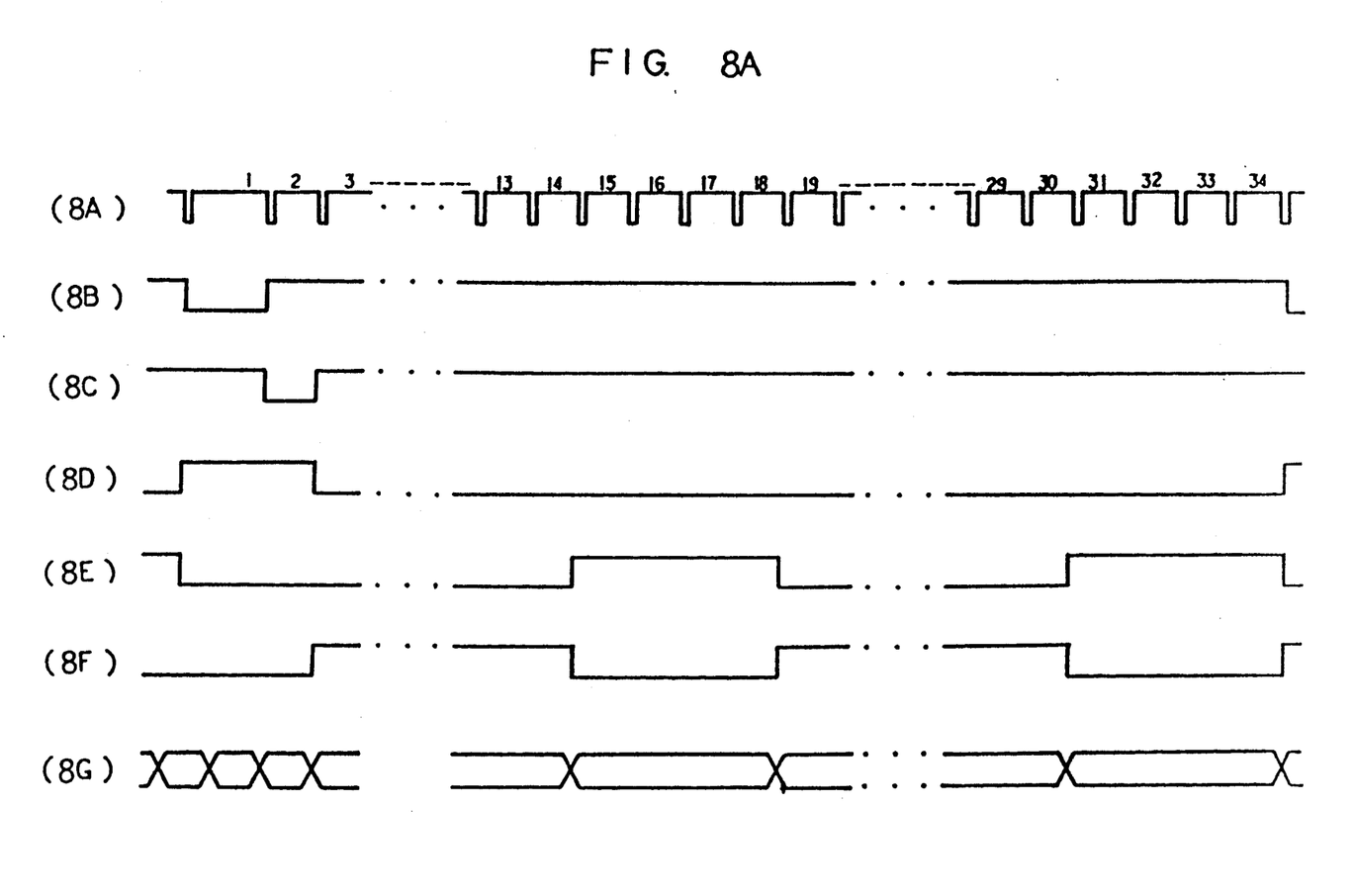
FIGS. 8A and 8B illustrate the operational waveforms according to the present invention.
Figure 8B:
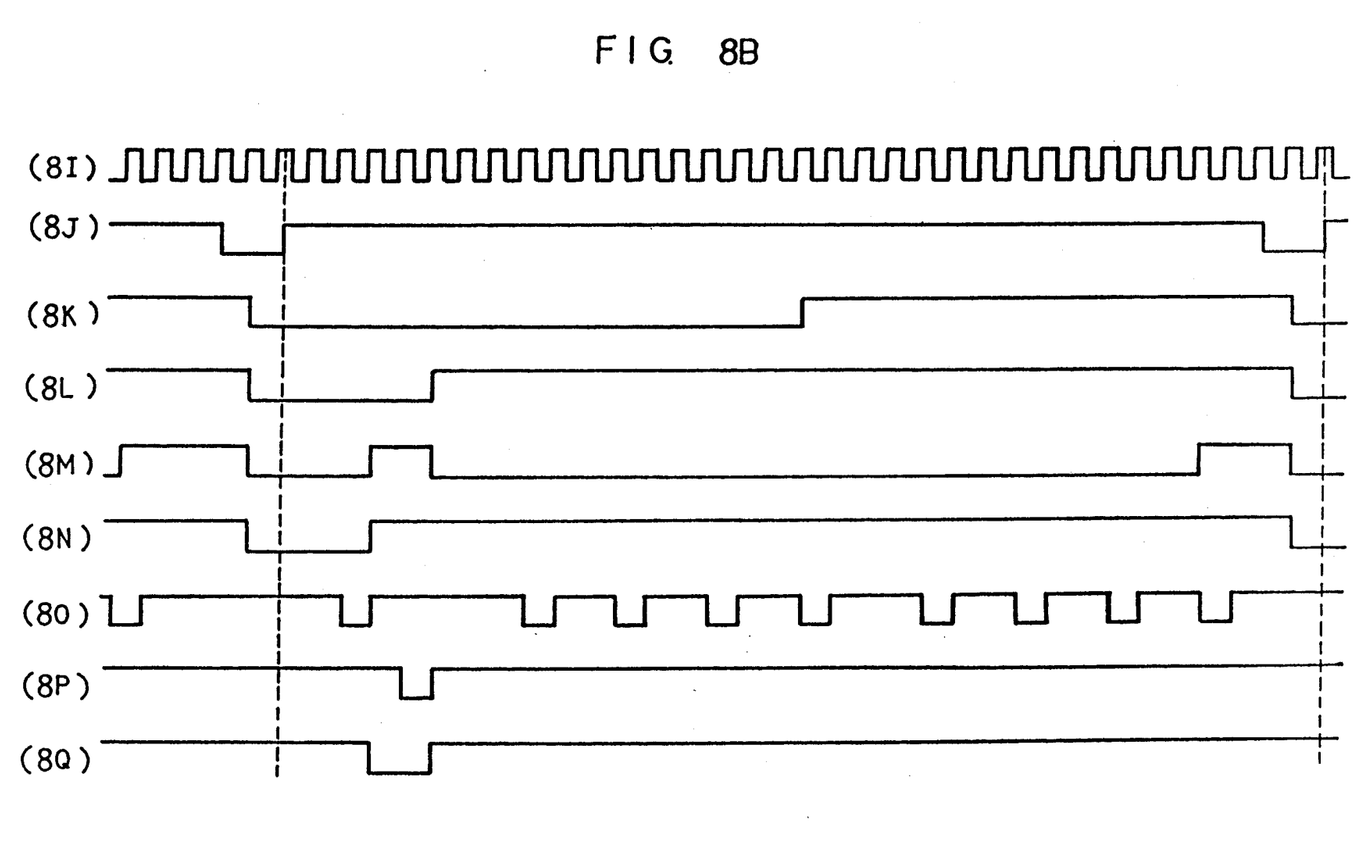

In the operational waveforms of the parts of FIG. 5, FIG. 8A illustrates the waveform of the symbol clock signal, FIG. 8B the waveform of the synchronizing signal, FIG. 8C the waveform of the sub-code signal, FIG. 8D the waveform of the data time, FIG. 8E the waveform of the data output interval, FIG. 8F the waveform of the parity output interval, FIG. 8G the waveform of the data bus, FIG. 8I the waveform of the system clock signal, FIG. 8J the enlarged waveform of the symbol clock signal of FIG. 8A, FIG. 8K the waveform of the select D(MSB), FIG. 8L the waveform of the select 1, FIG. 8M the waveform of the select 2(LSB), FIG. 8N the waveform of the audio data input interval, FIG. 8O the waveform of the write enable signal of the RAM 800, FIG. 8P the waveform of the read enable signal of the RAM 800, and FIG. 8Q the waveform of the EFM latch clock signal.

Figure 7A:
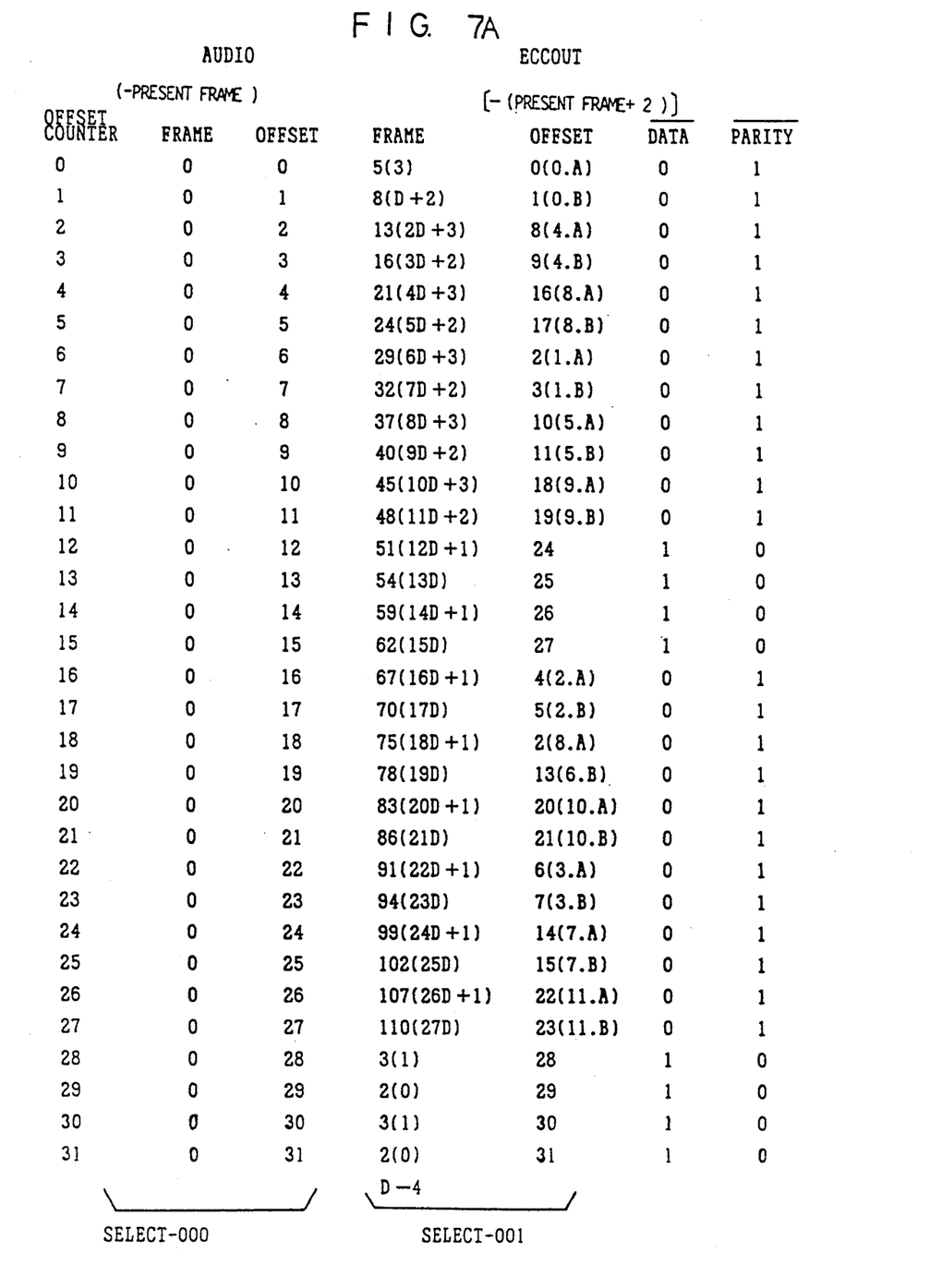
FIGS. 7A and 7B illustrate the construction of the frame and offset table.
Figure 7B:
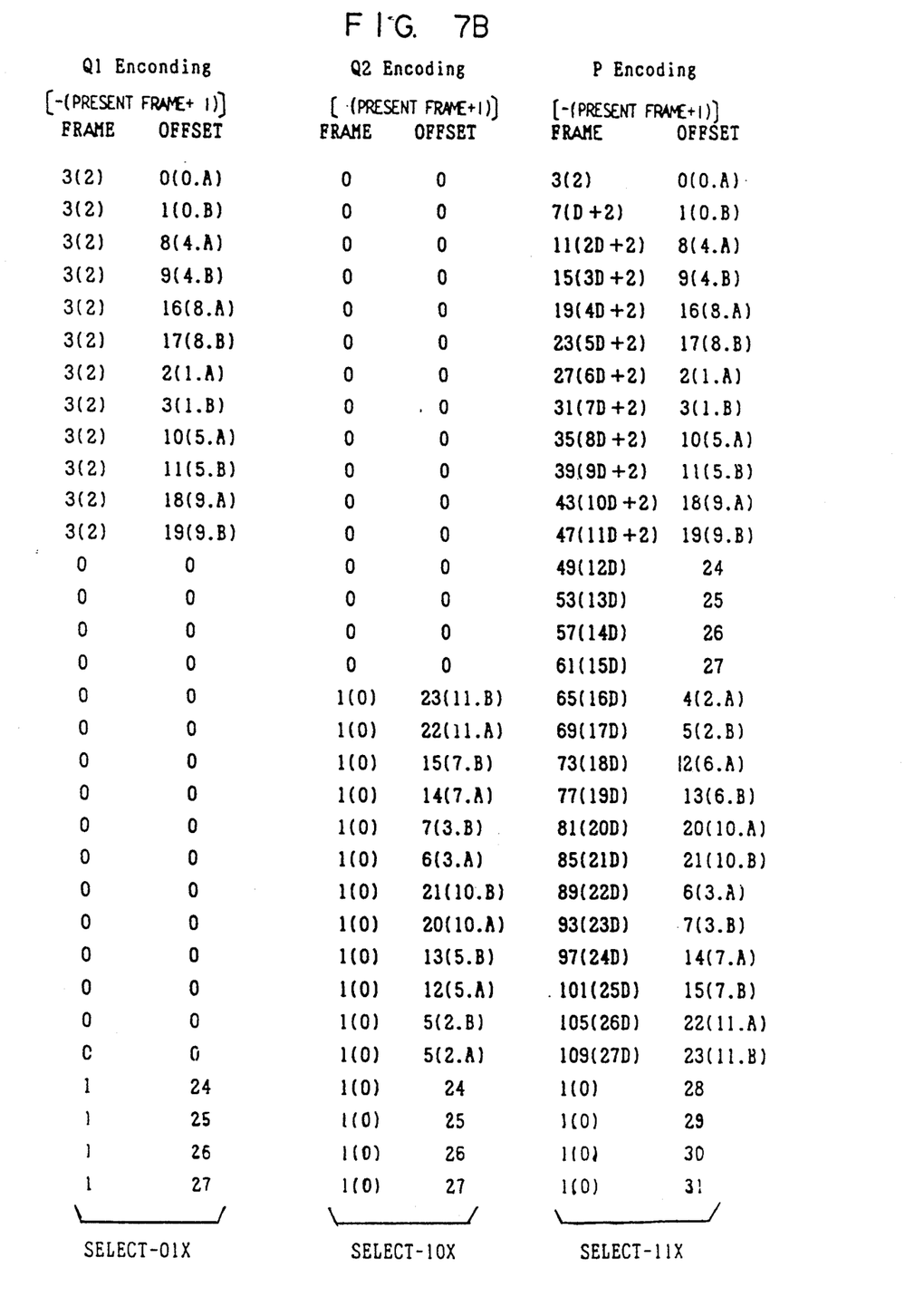

Describing more specifically the operation of the inventive circuit, the upper 8 bits of the 13 bits address line of the RAM 800 are used to represent the frame thereof, and the lower 5 bits the offset position of a frame. To adjust the frame and offset addresses, the frame and offset tables of FIGS. 7A and 7B are used to find corresponding addresses on the basis of the present frame and offset counted values. The frame counter 400 counts the frame clock signal (7.35 KHz) output from the controller 100 so as to distinguish one frame unit. The offset counter 300 counts the symbol clock signal (about 255 KHz) output from the controller 100 as shown in FIG. 8A so as to generate 32 offset values. At this time, the data time applied to the offset counter 300 as shown in FIG. 8D is to clear the offset counter 300 in the sub-code interval as shown in FIG. 8C and the synchronizing interval as shown in FIG. 8B within one frame interval.

By selection of the counted values of the frame counter 400 and offset counter 300, and the select value that is the control signal of the controller 100 may be accessed the corresponding symbol in the RAM 800 constructed as shown in FIG. 6. For example, when the select value of the controller 100 is 000 as shown in FIGS. 8J–8L, that is to store the audio data into the RAM 800, the frame table of the audio data in the frame and offset table of FIG. 7 represents "0" regardless of the frame counted value, so that the present frame counted value in the adder 700 is applied to the RAM 800 as the frame address.

Thereafter, as the counted value of the offset counter 600 is increased, the offset address is determined according to the offset table value of FIG. 7A, so that the audio data are stored into the RAM 800 successively from the beginning of the frame address. Next, when the select value of the controller 100 is 8001 in FIG. 8, that is to output the encoded data of the RAM 800 to the encoder 900, the frame delay and offset values are output according to the symbol number of FIG. 4, so that the frame delay value is added to the counted value of the frame counter 400 to determine the frame address, and the offset value determines the offset address, thus producing the data suited for the corresponding frame counter 400 and offset counter 300 to the RAM 800.

Likewise, when encoding the C1 and C2 of the encoder 900, the information data required for the encoding is applied to the encoder 900. In this case, the frame value in the frame table 500 to generate the parity and the frame value to perform the encoding are respectively delayed by two frames and one frame from the values shown in the specific block diagram of FIG. 3, so that, as shown in the frame memory map of FIG. 6, the audio data may be stored into the RAM 800 during one frame counting interval. Furthermore, the RAM 800 reads out the parity data that is the output of the encoder 900, and the C1 or C2 encoding data read out from the RAM 800 is synchronized with EFMLT in the first and second latch circuits 1000 and 1100. Namely, the audio data in the present frame is stored into the RAM 800, and the C1 and C2 encoding is performed so as to obtain one frame data as shown in FIG. 8H by adding the parity on the basis of the next frame, so as to output the data and parity completed from the counted value of the previous frame through the first and second latch circuits 1000 and 1100 in the next frame. In addition, the values of the frame and offset table of FIGS. 7A and 7B are all coded into the 8 bits 2'S complements so as to access the frame delayed from the present frame in the adder 700.

As stated above, the data stored in the RAM 800 is latched by the first latch circuit 1000 synchronized with the EFM latch clock signal in the low interval of FIG. 8E, and the parity data is inversely latched by the second latch circuit 1100 synchronized with the EFM latch clock signal in the high interval of FIG. 8F.

Thus there is provided a circuit for cross interleaving the digital audio data so as to adapt to the format of the compact disc by using a PROM, which circuit may be included in a compact disc player.

What is claimed is:

1. A cross interleaving circuit, comprising:
   a controller coupled to receive system clock pulses, for providing frame clock pulses, a selecting frame value, data clock pulses, and symbol clock pulses;
   a buffer responsive to said controller, for loading digital data on a data bus;
   an offset counter for counting said symbol clock pulses to provide an offset value of a frame;
   a frame counter for counting said frame clock pulses to determine a number of frames of digital data by providing a frame counted value;
   a frame table responsive to said offset value of the frame and said selecting frame value, for determining a number of delayed frames in order to perform encoding on the basis of a present frame, and to provide a frame table value;
   an offset table responsive to said offset value of the frame and said selecting frame value, for generating an offset address of said frame;
   an adder for adding said frame counted value and said frame table value to provide a frame address;
   a random access memory for temporarily storing said digital data, said offset address and said frame address within each frame;
   an encoder responsive to said controller, for encoding said digital data to provide encoded data having parity symbols;
   a first latch circuit for latching the encoded data by synchronizing the encoded data with eight-to-fourteen modulation clock pulses during a data interval; and
   a second latch circuit for inversely latching the encoded data by synchronizing the encoded data with said eight-to-fourteen modulation clock during a parity interval.

2. The cross-interleaving circuit as claimed in claim 1, wherein said system clock pulses have a frequency of 8.6436 MHz, said frame clock pulses have a frequency of 7.35 KHz, and said symbol clock pulses have a frequency of 255 KHz.

3. A cross-interleaving circuit, comprising:
   means for loading digital audio data onto a data bus;
   means for providing an offset value of a frame by counting symbol clock pulses, and for providing a frame counted value by counting frame clock pulses to determine the number of digital audio data frames;
   means responsive to said offset value of the frame and a selecting frame value, for providing a frame table value by determining a number of delayed frames for encoding said digital audio data on the basis of a present frame;
   means responsive to said offset value of the frame and said selecting frame value, for generating an offset address of said frame;
   means for adding said frame counted value and said frame table value to provide a frame address;
   means for temporarily storing said digital audio data, said offset address and said frame address within each frame;
   means for encoding said digital audio data to provide encoded data having parity symbols; and
   means for latching and inversely latching the encoded data by synchronizing the encoded data with eight-to-fourteen modulation clock pulses during a data interval and a parity interval respectively.

4. The cross-interleaving circuit as claimed in claim 3, wherein said frame clock pulses have a frequency of 7.35 KHz, and said symbol clock pulses have a frequency of 255 KHz.

5. A method for cross-interleaving digital audio data for a recordable compact disc player, comprising the steps of:
   processing a system clock signal to provide a frame clock signal, a selecting frame value, a data clock signal, and a symbol clock signal;
   loading said digital audio data on a data bus;
   counting said symbol clock signal to provide an offset value of a frame;
   counting said frame clock signal to determine a number of frames of digital audio data by providing a frame counted value;
   determining the number of delayed frames in dependence upon the offset value of the frame and the selecting frame value to provide a frame table value for encoding the digital audio data on the basis of a present frame;
   providing an offset address of said frame in dependence upon the offset value of the frame and the selecting frame value;
   adding said frame counted value and said frame table value to provide a frame address;
   temporarily storing said digital audio data, said offset address and said frame address within each frame;
   encoding said digital audio data to provide encoded data having parity symbols;
   latching the encoded data by synchronizing the encoded data with eight-to-fourteen modulation clock signal during a data interval; and
   inversely latching the encoded data by synchronizing the encoded data with said eight-to-fourteen modulation clock during a parity interval.

6. The method of cross-interleaving as claimed in claim 5, wherein said system clock signal has a frequency of 8.6436 MHz, said frame clock signal has a frequency of 7.35 KHz, and said symbol clock signal has a frequency of 255 KHz.

* * * * *